UNITED STATES PATENT OFFICE 2,313,531

PROCESS FOR MINIMIZING SLUDGE FORMATION IN OILS USED FOR SCRUBBING GASES

Louis J. Figg, Jr., and Edward E. Shaulis, Kingsport, Tenn., assignors to Eastman Kodak Company, Rochester, N. Y., a corporation of New Jersey No Drawing. Application February 21, 1940, Serial No. 320,134

5 Claims. (Cl. 183—115)

This invention relates to the improvement of scrubbing mediums and the use of such mediums in the treatment of artificial gas, particularly to the treatment of such scrubbing oils to render them susceptible of reactivation, or other processing, with considerably lower sludge formation than would occur if not treated by our invention.

In the production of city gas and the utilization thereof, there is encountered the troublesome problem of the formation of various deposits of sludge or gums during such gas production and handling. Not only does such sludge formation cause losses and produce deposits, but such deposits may impair the operation of the gas treating apparatus. Such difficulties and problems encountered in the gas industry have been described to some extent in Karrer and Lusby U. S. patent application 156,230, now Patent No. 2,191,486. As indicated in this patent, certain methods of treating artificial gas has involved scrubbing the gas with a scrubbing oil. Subsequently, the oil would be heated or otherwise processed for regenerating the oil. In processes of this type, losses of scrubbing medium and other difficulties referred to above have been encountered. In view of the discussion of these various problems in said Karrer and Lusby patent, it is unnecessary at this point to go into further detail.

Inventors Karrer and Lusby have devised a procedure which has made a substantial inroad for reducing these difficulties. However, it is readily apparent that the development of other chemicals and methods for overcoming these problems of sludge formation and the like, which have been encountered in the gas industry, is particularly desirable from the practical standpoint in order that the solution to the difficulty may not be based on and be dependent upon one reagent, but that the vast gas industry may be served by various agents.

After extensive investigation we have discovered certain reagents which may be used for minimizing sludge formation and allied difficulties encountered in the gas industry. Certain of our reagents may exhibit improved chemical efficacy as will be pointed out in detail hereinafter.

This invention has for one object to provide reagents, classes of reagent, chemical compounds or mixtures thereof which may be used in the gas industry for minimizing or reducing sludge formation and related or allied difficulties. Another object is to provide improvement in gas treating processes wherein the scrubbing medium is rendered more readily susceptible to reactivation. Another object is to reduce or prevent losses of various chemical compounds in such gas treating processes and to render such chemical compounds in a form susceptible of recovery. A still further object is to provide new scrubbing mediums for use in the gas industry, the separation of gaseous mixtures, the recovery of unsaturated compounds and related fields. Still another object is to reduce the impairment and injury to certain of the equipment used in the artificial gas industry. Other object will appear hereinafter.

We have found that very satisfactory results may be obtained, particularly in scrubbing steps of processing artificial gas by utilization of a scrubbing medium containing certain aromatic derivatives, as will be described in detail hereinafter.

The production of various types of artificial gas are well-known processes and a description of illustrative processes may be found in "Rogers Industrial Chemistry," vol. II, chapter XXIV. The exact method of production of the gas to be treated is not vital as respects the present invention. It is pointed out that after artificial gas has been produced, prior to its utilization and/or distribution, the gas may be subjected to a washing or scrubbing treatment by means of various mediums. One scrubbing medium frequently used is the high boiling petroleum oil known as "absorbent" or "straw oil." Our invention is described with particular reference to such conventional scrubbing mediums, but it is to be understood that there are various other mediums which may be employed in a comparable manner; hence, we do not wish our invention to be unduly restricted in this aspect. The scrubbing medium, as for example a high boiling point petroleum oil of some nature, may be brought into contact with the gas as by countercurrent contact in a column, sprayed through the gas, or the gas otherwise treated with the scrubbing medium.

After the oil has been brought into contact with the gas, the oil then contains various materials removed from the gas and in order to render the oil reusable, it may be subjected to various types of reactivation or regeneration treatments. As a result of such treatments which usually involve heating and distillation, sludge formation, gumminess or other difficulties may occur which not only may handicap the operation of the process, but may entail actual losses of the scrubbing medium through entrapment, discoloration thereof, or otherwise.

In further detail, for example, in the conventional operation of a process for scrubbing artificial gas, the oil scrubbing medium used was followed by heating to drive off the oil so that it might be recycled. In this process several percent of the volume of the oil was lost each time the oil was recycled. The exact amount lost in any particular instance depends to some extent on the composition of the gas being scrubbed. However, even under favorable treating conditions at least 1% or 2% of the oil was lost in each cycle and higher losses were encountered in other instances.

We found that such difficulties could be materially improved by incorporating in the scrubbing medium at any point in the cycle a small amount of certain aromatic compounds or mixtures of such compounds. Various amounts ranging from .005% to 1.00% by weight of the scrubbing medium have been found satisfactory. However, for most purposes the maximum addition need not exceed about .300%. In the instances where a polymerizable hydrocarbon is being recovered, it may be desirable to use amounts other than those specified, depending upon the quantity and reactivity of the compound to be recovered and other factors. For example, in the instance of pine oils and wood tar distillates, because of their low cost and the like factors, several per cent might be employed. It will be noted that in our process the reagent is incorporated with the scrubbing medium.

The effectiveness of our compounds will be more apparent from the following comparison. In comparing the effectiveness of our compounds with another reagent, there are various factors which can be taken into consideration, such as, for example, the cost of a unit volume of our reagent as compared with other reagents. Or, other factors such as the availability of the respective agents, the hazards of handling the agents, etc. In considering some of our compounds, such as coal tar distillates, it will be observed that while the sludge preventing ratio may not be as high as others, because of availability at gas manufacturing plants, they have certain merit.

However, for simplicity of comparison, the numerical values herein referred to have been arrived at solely on a chemical basis.

For the purpose of a standard of comparison, we have arbitrarily adopted as a standard, a scrubbing medium having incorporated therein a certain amount of a distillate derived from a hard wood tar. The sample of hard wood tar used in preparing the standard was one having a boiling point between about 200° C.–300° C. but otherwise was conventional and average. It is believed that this provides a very satisfactory standard, inasmuch as such distillates boiling between about 200°–300° C. derived from hard wood tar are used commercially and represents very satisfactory agents for reducing sludge formation.

In making our comparison, the standard was prepared comprising the scrubbing oil having incorporated therein the distillate from wood tar as above discussed. The scrubbing medium to be compared with the standard, comprised the same oil having incorporated therein our aromatic compounds. The volumes and like conditions were the same in both instances and as customary in chemical tests, a plurality of runs including blanks on the scrubbing medium untreated with any agent, were made in order that check results would be simultaneously obtained.

The standard and the materials to be tested and compared, etc., were subjected to substantially the same treatment. The treatment involved temperatures of 212° F., and greater, substantial periods of time, and drastic oxidizing conditions. For convenience, the comparison arrived at will be referred to as the resistance of the material tested with respect to said standard. The values arrived at below were computed in accordance with the following equation:

Resistance of the reference oil plus material tested minus resistance of the reference oil
―――――――――――――――――――――――――――――――――――
Resistance of the reference oil plus standard hard wood distillate minus the resistance of the reference oil By such a comparison it can be seen that results are more or less in terms of reagent used, any deviations due to a possible variation in the scrubbing medium being substantially eliminated.

On the basis of such comparison, our preferred agents exhibited very satisfactory sludge preventing ratios. For example,

| Name | Approximate sludge-preventing ratio |
|---|---|
| Xylenol (ortho-, meta- and para) | 2.5 |
| Phenolic ethers | [1] 1.58 |
| Pine wood phenols | [1] 1.50 |
| Alpha naphthol | 4.3 |

[1] And higher.

We have found that other agents are satisfactory, although they do not exhibit sludge preventing ratios as great as those just described. Because of their availability at gas producing plants, coal tar distillates may have value. We have found that coal tar distillates of the fraction boiling between 140° C.–300° C. exhibit sludge preventing characteristics. The preferred coal tar distillate fraction would lie in the range of 200°–270° C. We have also found that certain soft wood oils possess sludge preventing properties.

An analysis of these oils is given in the following table:

| | Pine tar oil | Pine wood phenols |
|---|---|---|
| Caustic solubility | 24% | 80% |
| Boiling range—F. D | 110.0° C | 104.0° C. |
| 5% | 117.0° C | 212.0° C. |
| 10% | 180.0° C | 216.0° C. |
| 20% | 190.0° C | 222.0° C. |
| 30% | 195.0° C | 228.0° C. |
| 40% | 200.0° C | 231.0° C. |
| 50% | 204.0° C | 238.0° C. |
| 60% | 210.0° C | 248.0° C. |
| 70% | 216.0° C | 261.0° C. |
| 80% | 223.0° C | 282.0° C. |
| 90% | 256.0° C | 306.0° C. |
| 95% | 275.0° C | |
| | Decomposes at 275.0° C. | Decomposes at 306.0° C. |
| Sludge preventing ratio | 0.54 | 1.55. |

In general, it may be stated that we have found soft wood distillates comprising the fractions 140° C.–275° C. and 200° C.–300° C. may be employed. The amount of such distillates which may be added may vary from about .005% to .50%. However, we prefer to use from about .05% to about .3% of the weight of the scrubbing oil. Similar amounts may also be employed with respect to the aforementioned coal tar distillates, xylenols, etc.

In more detail, some of the phenolic ethers which we have found satisfactory are as follows: Guaiacol—monomethyl ether of catechol—$C_6H_4.OH.OCH_3$, creosol—methyl guaiacol—methoxy methyl phenol—$C_6H_3.OH.OCH_3.CH_3$, ethyl guaiacol—methoxy ethyl phenol—$C_6H_2.OH.OCH_3.C_2H_5$, propyl guaiacol—methoxy propyl phenol—$C_6H_3.OH.OCH_3.C_3H_7$, dimethyl guaiacol—$C_6H_2.OH.OCH_3.(CH_3)_2$, methyl catechol dimethyl ether—$C_6H_3.CH_3.(OCH_3)_2$, pyrogallol dimethyl ether—$C_6H_3.OH.(OCH_3)_2$, methyl pyrogallol dimethyl ether—

$$C_6H_2.OH.CH_3.(OCH_3)_2$$

propyl pyrogallol dimethyl ether—

$$C_6H_2.OH.C_3H_7.(OCH_3)$$

eugenol—propylene guaiacol—allyl methoxyphenol—$C_6H_3.OH.OCH_3.(CH_2CH=CH_2)$.

The selective activity of our preferred agents is further emphasized by the fact that we have found that homologues of these compounds while possessing some value, may not function with the same effectiveness. As an example of this β-naphthol may be mentioned. This homologue has a S. P. R. of only about .55.

Cresylic acid and certain cresols we have also found, if incorporated into petroleum oil scrubbing mediums in amounts as aforementioned, are useful. Similar remarks apply to the use of hydroquinone and pyrogallol, but these latter compounds are not preferred. As already indicated, these compounds should be incorporated with the scrubbing medium.

In addition to saving scrubbing medium by the incorporation of our aromatic compounds therein, other savings may be entailed in the process. It is apparent that in the prior art processes where several per cent oil may be lost in the sludge and wherein sludge is formed, that to a substantial extent this sludge may represent losses by hydrocarbon components from the artificial gas.

For example, in many instances artificial gas may contain more or less styrene. In conventional processes this styrene may be lost in the step of reactivating the scrubbing oil or other steps in the process which may cause the polymerization of or other losses of the styrene. However, in our process wherein the scrubbing medium contains one or more of our reagents, we have found that styrene extracted into this scrubbing medium remains substantially intact during the scrubbing and subsequent processing or reactivation of the scrubbing medium. Inasmuch as the styrene remains available as such, it may be recovered by any conventional method as for example by separation from the scrubbing medium, reaction in the scrubbing medium with another material, neutralization of our reagent to release the styrene for reaction, or otherwise utilized. Similar remarks apply to other valuable components which may be present in the artificial gas such as indene. If such other unstable and unsaturated compounds are extracted into our novel scrubbing mediums, they remain more or less intact and in condition for saving.

As already pointed out, our reagents may be incorporated into scrubbing mediums in various proportions. Usually less than ½% by weight of the scrubbing medium is sufficient, but higher amounts may be employed and as indicated with respect to compounds such as coal tar distillates, pine oils, etc., several per cent may be used.

It is to be noted in connection with our invention that we prefer to actually incorporate a small amount of one or more of our ingredients in the scrubbing medium and not use the material as the scrubbing medium, or make direct addition to the gas.

Our reagents may be constantly or intermittently added to, blown in the scrubbing medium, or otherwise incorporated therewith. Consequently, we do not wish to be restricted in this respect. Our novel scrubbing mediums usually comprising a petroleum oil and at least one aromatic derivative as above described, may be used in the recovery of unsaturated compounds such as styrene, indene and the like from gas mixtures other than artificial gas.

By the term "artificial gas" we refer to any of the various gas mixtures known in industry, containing toluol, benzol, and various unsaturated hydrocarbons as styrene.

It is apparent from the foregoing that our invention is susceptible of some modification; hence, we do not wish to be restricted excepting insofar as may be necessitated by the prior art and the spirit of the appended claims.

What we claim and desire to be secured by Letters Patent of the United States is:

1. In the manufacture of artificial gas by procedure wherein the gas is subjected to a scrubbind medium essentially comprised of straw oil, the steps which comprise scrubbing said gas with said straw oil scrubbing medium which contains a small amount of a phenolic ether having a sludge-preventing ratio greater than 1.2, said phenolic ether having been blown into said scrubbing medium.

2. The process of treating gas which comprises scrubbing the gas with a scrubbing medium essentially comprised of a free-flowing, high-boiling petroleum oil of the character of straw oil having present therein a content of at least one phenolic ether, having a sludge-preventing ratio greater than 1.5, subjecting the scrubbing medium after it is used for scrubbing gas as aforesaid and while containing therein at least a part of the components scrubbed out, to a reaction treatment which includes heating and reusing the reactivated scrubbing medium for contacting with further gas.

3. In a process for the treatment of a gas containing styrene, the steps which comprise contacting said gas with a scrubbing medium essentially comprised of straw oil, said oil having incorporated therein a small content of a phenolic ether, having a sludge-preventing ratio substantially greater than 1.

4. In a process for scrubbing artificial gas including contacting the gas with an oily scrubbing medium which is free flowing and has a boiling point substantially greater than the boiling point of gasoline, heating the used scrubbing medium to reactivate it and separate it from components taken up therein during said scrubbing, the improvement steps which comprise incorporating with the oil prior to said heating at least one phenolic ether, having a sludge-preventing ratio substantially greater than 1.

5. In a process for scrubbing artificial gas including contacting the gas with an oily scrubbing medium which is free flowing and has a boiling point substantially greater than the boiling point of gasoline, heating the used scrubbing medium to reactivate it and separate it from components taken up therein during said scrubbing, the steps which incorporate therein a small content of at least one phenolic ether having a sludge-preventing ratio substantially greater than 1.

LOUIS J. FIGG, JR.
EDWARD E. SHAULIS.